US009201410B2

(12) United States Patent
Ambekar et al.

(10) Patent No.: US 9,201,410 B2
(45) Date of Patent: Dec. 1, 2015

(54) METHODS AND SYSTEMS FOR OPTIMIZING FARM-LEVEL METRICS IN A WIND FARM

(75) Inventors: Akshay Ambekar, Bangalore (IN); Venkatarao Ryali, Bangalore (IN); Awadesh Kumar Tiwari, Bangalore (IN)

(73) Assignee: General Electric Company, Niskayuna, NY (US)

( * ) Notice: Subject to any disclaimer, the term of this patent is extended or adjusted under 35 U.S.C. 154(b) by 951 days.

(21) Appl. No.: 13/335,993

(22) Filed: Dec. 23, 2011

(65) Prior Publication Data

US 2013/0166082 A1 Jun. 27, 2013

(51) Int. Cl.
*G05B 13/04* (2006.01)
*F03D 7/04* (2006.01)

(52) U.S. Cl.
CPC .............. *G05B 13/04* (2013.01); *F03D 7/045* (2013.01); *F03D 7/048* (2013.01); *G05B 13/041* (2013.01); *G05B 2219/2619* (2013.01); *Y02B 10/30* (2013.01)

(58) Field of Classification Search
None
See application file for complete search history.

(56) References Cited

U.S. PATENT DOCUMENTS

| | | | |
|---|---|---|---|
| 6,724,097 | B1 | 4/2004 | Wobben |
| 7,351,033 | B2 | 4/2008 | McNerney |
| 7,528,496 | B2 | 5/2009 | Fortmann |
| 7,756,609 | B2 | 7/2010 | Jurkat et al. |
| 2002/0000723 | A1 | 1/2002 | Weitkamp |
| 2004/0096327 | A1 | 5/2004 | Appa et al. |
| 2004/0108732 | A1 | 6/2004 | Weitkamp |
| 2004/0112131 | A1 | 6/2004 | Wobben |
| 2005/0042098 | A1 | 2/2005 | Wobben |
| 2006/0113801 | A1 | 6/2006 | Schubert et al. |
| 2006/0140764 | A1 | 6/2006 | Smith et al. |
| 2006/0279088 | A1 | 12/2006 | Miller et al. |
| 2007/0047163 | A1 | 3/2007 | Lutze et al. |
| 2007/0124025 | A1* | 5/2007 | Schram et al. ............... 700/287 |

(Continued)

FOREIGN PATENT DOCUMENTS

| | | |
|---|---|---|
| EP | 2264314 A2 | 12/2010 |
| EP | 2354541 A1 | 8/2011 |

(Continued)

OTHER PUBLICATIONS

Voller, S et al.; "Wind Farms With Energy Storages Integrated At The Control Power Market"; Integration of Wide-Scale Renewable Resources Into the Power Delivery System, 2009 CIGRE/IEEE PES Joint Symposium; 2009; On pp. 1-13.

*Primary Examiner* — Ryan Jarrett
(74) *Attorney, Agent, or Firm* — Ann M. Agosti

(57) ABSTRACT

A method for optimizing one or more farm-level metrics in a wind farm is presented. The method includes identifying an optimization objective and one or more decision variables for optimization. Furthermore, the method includes optimizing the optimization objective based on wake-affected wind conditions, power capture values, or damage equivalent load values, to calculate optimum decision variable values for each wind turbine. The method also includes transmitting the optimum decision variable values to the respective wind turbines. In addition, the method includes applying the optimum decision variable values to the respective wind turbines to achieve the optimization objective. Systems and non-transitory computer readable medium configured to perform the method for optimizing one or more farm-level metrics in a wind farm are also presented.

15 Claims, 5 Drawing Sheets

(56) References Cited

U.S. PATENT DOCUMENTS

| | | | |
|---|---|---|---|
| 2007/0299548 A1* | 12/2007 | Weitkamp | 700/52 |
| 2008/0103611 A1 | 5/2008 | Altemark | |
| 2008/0118354 A1 | 5/2008 | Jeppesen et al. | |
| 2008/0140349 A1 | 6/2008 | Behera et al. | |
| 2008/0150283 A1 | 6/2008 | Rivas et al. | |
| 2008/0170941 A1 | 7/2008 | Ghosh et al. | |
| 2009/0099702 A1* | 4/2009 | Vyas et al. | 700/287 |
| 2009/0187282 A1 | 7/2009 | Menke et al. | |
| 2009/0206606 A1 | 8/2009 | Jorgensen et al. | |
| 2009/0212563 A1 | 8/2009 | Morjaria | |
| 2009/0218818 A1 | 9/2009 | Cardinal et al. | |
| 2009/0281675 A1 | 11/2009 | Rasmussen et al. | |
| 2009/0295160 A1 | 12/2009 | Wittekind et al. | |
| 2009/0309361 A1 | 12/2009 | Jurkat | |
| 2010/0109447 A1 | 5/2010 | Achilles et al. | |
| 2010/0237617 A1* | 9/2010 | Vyas et al. | 290/44 |
| 2010/0268393 A1 | 10/2010 | Fischle et al. | |
| 2010/0274399 A1 | 10/2010 | Alonso Sadaba et al. | |
| 2010/0283246 A1 | 11/2010 | Christensen | |
| 2010/0332272 A1 | 12/2010 | Ong et al. | |
| 2011/0006525 A1 | 1/2011 | Cleve et al. | |
| 2011/0133458 A1 | 6/2011 | Harrison et al. | |
| 2011/0142619 A1* | 6/2011 | Subramanian et al. | 416/1 |
| 2011/0166717 A1 | 7/2011 | Yasugi | |
| 2011/0187106 A1 | 8/2011 | Ichinose et al. | |
| 2011/0223018 A1* | 9/2011 | Srinivasan et al. | 416/1 |
| 2012/0133138 A1* | 5/2012 | Sorensen et al. | 290/44 |
| 2013/0103202 A1* | 4/2013 | Bowyer et al. | 700/275 |

FOREIGN PATENT DOCUMENTS

| | | | |
|---|---|---|---|
| WO | 0118937 A1 | 3/2001 | |
| WO | 2006120033 A2 | 11/2006 | |
| WO | 2009016020 A1 | 2/2009 | |

* cited by examiner

METHODS AND SYSTEMS FOR OPTIMIZING FARM-LEVEL METRICS IN A WIND FARM

BACKGROUND

Embodiments of the present disclosure relate to wind turbines, and more particularly to methods and systems for optimizing one or more wind farm metrics.

A wind turbine converts wind energy into electrical energy. For this conversion, the turbine includes one or more rotor blades that convert wind energy into mechanical energy as wind blows across the surface of the blades, and a generator (coupled to the rotor blades) that converts the mechanical energy of the rotating blades into electricity. Other components such as a step-up gearbox to increase rotation speed, blade control mechanism to alter rotor efficiency and turbine loads (for example: full-blade pitch actuators), a yaw mechanism to track the wind direction, aerodynamic and mechanical braking mechanisms to stop the turbine, and a cooling unit to cool the gearbox and the generator during operation may also be present.

A single wind turbine may generate enough electricity to supply power for a house or a farm. However, the single wind turbine may not be able to generate enough electricity to supply power to an entire town. Therefore, for large grids, a wind farm (collection of turbines) may be implemented. The turbine outputs may be connected to a common output, which powers nearby areas.

Typically, in a wind farm, each wind turbine attempts to maximize its own power output while maintaining its fatigue loads within desirable limits. To this end, each turbine includes a control module, which attempts to maximize power output of the turbine in the face of varying wind and grid conditions, while satisfying constraints like sub-system ratings and component loads. Based on the determined maximum power output, the control module controls the operation of various turbine components, such as the generator/power converter, the pitch system, the brakes, and the yaw mechanism to reach the maximum power efficiency.

Often, while maximizing the power output of a single wind turbine, neighboring turbines may be negatively impacted. For example, downwind turbines may experience large wake effects caused by an upwind turbine. Wake effects include reduction in wind speed and increased wind turbulence downwind from a wind turbine typically caused by the conventional operation of upwind turbines (for maximum power output). Because of these wake effects, downwind turbines receive wind at a lower speed, drastically affecting their power output (as power output is proportional to wind speed). Moreover, the turbulence effects negatively affect the fatigue loads placed on the downwind turbines, and thereby affect their life (as life is proportional to fatigue loads). Consequently, maximum efficiency of a few wind turbines may lead to sub-optimal power output, performance, or longevity of other wind turbines in the wind farm.

Certain currently available techniques attempt to optimize the wind farm power output rather than the power outputs of individual wind turbines, through coordinated control of the wind farm turbines. These optimization techniques, however, optimize a single turbine control parameter, such as an angle of inclination of rotor blades (or a blade pitch angle). Optimization of these physical parameters may not affect turbine behavior over its entire operating range, and might inadvertently alter other parameters and therefore prevent effective maximization of the achievable power output from the wind farm. Moreover, these techniques merely attempt to maximize only the power output of the farm and fail to optimize any other farm related metric, such as fatigue loads, or turbine component life.

BRIEF DESCRIPTION

In accordance with aspects of the present disclosure, a method for optimizing one or more farm-level metrics in a wind farm is presented. The method includes identifying an optimization objective and one or more decision variables for optimization. Furthermore, the method includes optimizing the optimization objective based on wake-affected wind conditions, power capture values, or damage equivalent load values, to calculate optimum decision variable values for each wind turbine. The method also includes transmitting the optimum decision variable values to the respective wind turbines. In addition, the method includes applying the optimum decision variable values to the respective wind turbines to achieve the optimization objective. A non-transitory computer readable medium including one or more tangible media, where the one or more tangible media include code adapted to perform the method for optimizing one or more farm-level metrics in a wind farm is also presented.

In accordance with aspects of the present disclosure, a wind farm optimization system is presented. The system includes a wind sensor configured to detect wind information, the wind information comprising wind speed and wind direction. Furthermore, the system includes a farm controller operatively coupled to the wind sensor and configured to identify an optimization objective and one or more decision variables and calculate optimum decision variable values such that the optimization objective is maximized based on the wind information. Moreover, the system includes one or more wind turbines having one or more turbine controllers configured to apply the optimum decision variable values to the wind turbines to alter turbine operation.

In accordance with yet another aspect of the present disclosure, a system for optimizing a farm-level metric in a wind farm comprising a plurality of wind turbines is presented. The system includes a farm controller configured to identify an optimization objective and one or more decision variables, calculate wake penalties for each wind turbine on the wind farm, transmit the wake penalties to a corresponding wind turbine, and determine based on decision variable values whether the farm-level objective is optimized. Additionally, the system includes one or more turbine controllers operatively coupled to the wind turbines and configured to calculate a composite objective value corresponding to a wind turbine based on the wake penalties and a turbine-level metric, optimize the composite objective value, and communicate the optimal decision variable values to the farm controller.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present disclosure are related to a system and method for optimizing one or more metrics of a wind farm. For example, the methods and systems described here may be utilized to optimize power capture at the wind farm or the fatigue loads experienced by the wind turbines in the wind farm.

A wind farm includes multiple wind turbines coupled to one another and to a central farm controller. The farm controller receives prevailing wind information, including wind speed and wind direction from one or more sensors around the wind farm. Various empirical models present in the farm controller, such as wind field models, wake models, and turbine performance models may provide an estimate of wake-effects of one wind turbine on other wind turbines. The farm controller further selects the best optimization metric for the wind farm based on the current wind information, assimilated wind climate, and turbine damage equivalent loads. Moreover, the farm controller may select one or more decision variables for optimization. Based on prevailing farm wind conditions, static data like farm terrain information, turbine layout information, turbine performance information, and a set of decision variable values, the farm controller calculates the farm metrics to be optimized. Subsequently, the farm controller determines the optimum values for the decision variables such that the associated farm metric may be optimized. The farm controller may adopt any technique described in this disclosure or otherwise known to arrive at optimum decision variable values.

As referred to in this disclosure, farm metric may refer to farm-level power capture or farm-level fatigue loads experienced by the individual wind turbines in the wind farm. Typically, while one farm metric is optimized, the other is constrained. For example, if power capture is maximized, farm-level fatigue loads are constrained to a value smaller than the value of normal operation of the farm turbines. It will be noted that the terms farm metrics and optimization objective may be interchangeably used throughout the disclosure. Further, turbine-level metric may refer to the power capture or fatigue loads pertinent to individual wind turbines.

Figure 1:
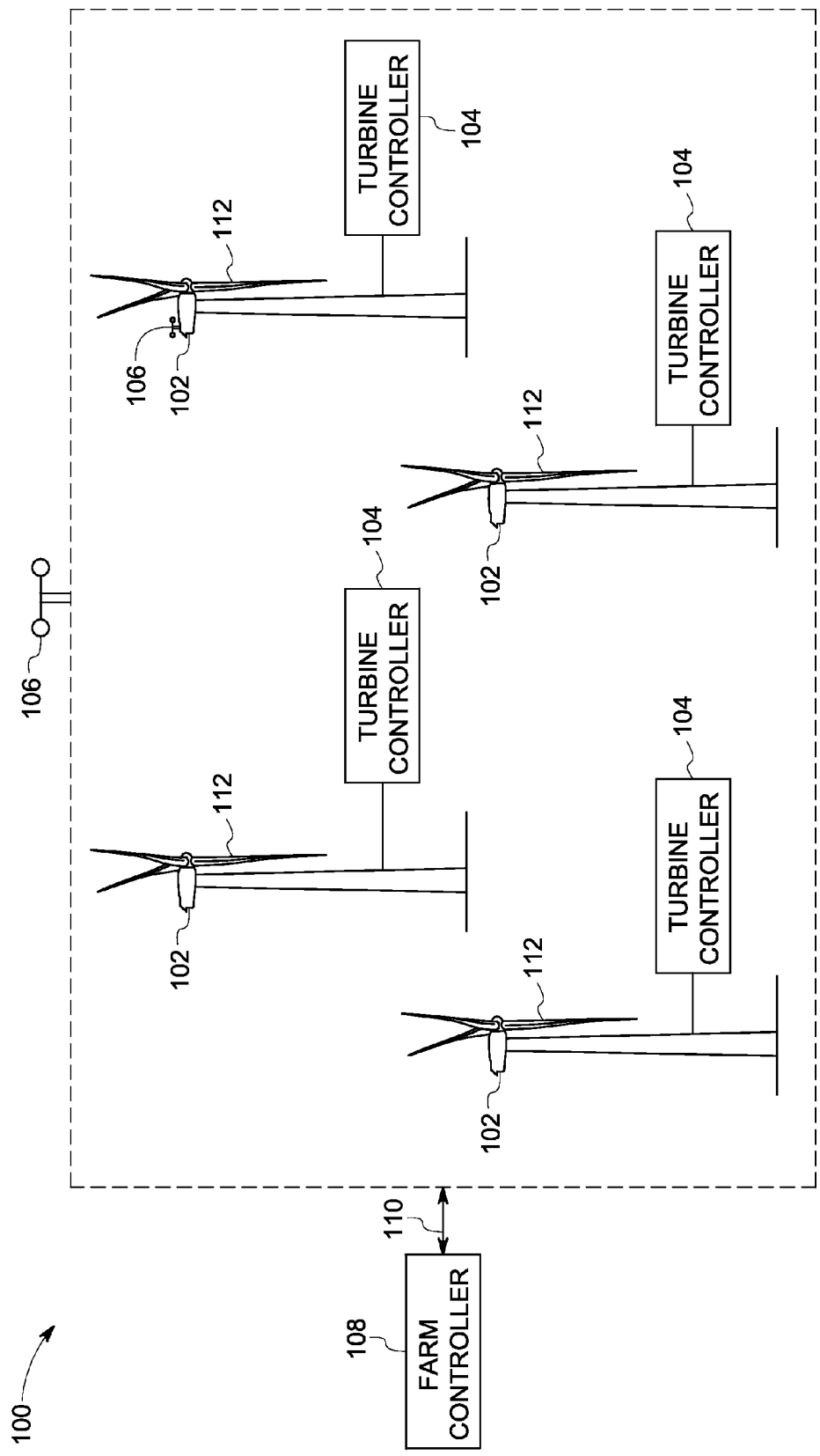
FIG. 1 is a diagrammatical illustration of an exemplary wind farm, according to embodiments of the present disclosure.

FIG. 1 illustrates an exemplary embodiment of a wind farm 100 according to aspects of the present disclosure. The wind farm 100 includes a plurality of wind turbines 102, each having its own turbine controller 104. Further, the wind farm 100 may include one or more wind sensors 106 and a farm controller 108. Moreover, in one embodiment, the farm controller 108 may be coupled to the turbine controllers 104 and the wind sensors 106 through a network 110 to facilitate communication between the various wind farm components.

The wind turbines 102 may be arranged in any fashion. By way of example, the wind turbines 102 may be arranged in an array of rows and columns, in a single row, or in a random arrangement. Typically, wind turbine arrangement in a wind farm is determined based on numerous optimization algorithms such that annual energy production is maximized for corresponding site wind climate. It will be understood that any wind turbine arrangement may be implemented, such as on uneven land, without departing from the scope of the present disclosure.

Each wind turbine 102 may include one or more energy conversion modules such as rotor blades 112, a step-up gearbox (not shown in FIG. 1), and a power generator (not shown in FIG. 1) that convert wind energy into usable electrical energy. In addition to these modules, the wind turbines 102 may also include a blade pitch mechanism to regulate turbine power output and rotor speed, yaw mechanism (not shown), and a wind sensor (not shown in FIG. 1) that work cohesively to swivel and align the rotor blades 112 in line with the wind direction. Other modules (not shown in FIG. 1) may include a cooling unit to prevent the wind turbine components 102 from overheating, a braking system to stop the rotor blades 112 from rotating when required, and a nacelle that protects all these modules from the environment.

During operation, often, the rotor blades 112 of the wind turbines 102 may face in a substantially similar direction, such as the incoming wind direction. This blade alignment may place certain wind turbines 102 behind another wind turbines. Consequently, the operation of some wind turbines 102 may be adversely affected by the wake effects caused by other wind turbines. Wake effects are adverse effects of an operating wind turbine on the wind downstream of that wind turbine. For example, when wind blows across the rotor blade 112, the rotor blades 112 rotate and convert some of the wind's kinetic energy into mechanical energy, thereby reducing the wind speed downwind of that wind turbine 102. The wake effects are often more pronounced in the region directly downstream of the turbine. Wake effects also result in increased turbulence in the downstream wind due to operation of an upwind turbine.

Consequently, the wind turbines 102 that are aligned behind an upwind turbine may generate lower power than the upwind wind turbine because the output power of a wind turbine is proportional to incoming wind velocity. In addition to reducing the power output of the downwind turbines, the turbulence caused by the wake effects may also affect the life of downwind wind turbines by increasing fatigue loads placed on downwind wind turbines. As used herein, the term fatigue refers to the damage experienced by a turbine component because of cyclic loading. Further, fatigue loading may initiate small cracks in the component surface. Over time and with each cyclic load, the cracks increase in size and propagate, often leading to catastrophic failure. Therefore, to maintain wind turbines over time and increase their life, it is desirable to maintain fatigue loads under control.

While more efficient rotor operation may increase the power output of a wind turbine for a given wind speed, such operation also increases the wake effects downstream of the wind turbine and hence reduces the power efficiency of other wind turbines in the wind farm 100, in addition to increasing their fatigue loads. Therefore, in a wind farm, where the operation of one wind turbine may negatively impact the performance of another wind turbine, it may be desirable to balance the power output and fatigue loads of the wind turbines in terms of wake effects such that the overall farm-level performance is optimized. Moreover, in certain wind conditions, it may be beneficial to optimize the power output of the wind farm, while maintaining fatigue loads within safe limits, while in other conditions, it may be advisable to minimize the fatigue loads of wind turbines, while maintaining the power capture above a determined minimum level.

To this end, each wind turbine 102 may include a turbine controller 104, which may be communicatively coupled to the farm controller 108. Furthermore, the turbine controller 104 may control the operation of the wind turbines 102 such that at least one optimization objective, such as the farm-level power output or the worst-case fatigue loads in the wind farm 100, is optimized. For example, to optimize the farm-level power output, the turbine controller 104 may balance the maximum power output of each wind turbine 102 and the wake effects caused by each wind turbine 102 on neighboring wind turbines 102. In addition to these activities, the turbine controller may periodically or in real time measure the actual power capture at the wind turbine 102 and/or the actual fatigue damage experienced by the wind turbines. During operation, the turbine controller 104 may communicate these measurements to the farm controller to aid in the optimization calculations. The turbine controller 104 may include one or more modules and/or data repositories that allow the turbine controller 104 to perform these functions. These modules will be described in detail with reference to FIG. 3.

The wind sensors 106 may be configured to monitor prevailing wind conditions, such as wind speed and direction. The wind sensors 106 may also be configured to monitor other wind properties such as ambient temperature or air pressure. Some or all of these wind properties may affect the wind turbines 102 or the wind farm operation. The wind sensors 106 may be any known or later developed sensors. For instance, the wind sensors 106 may be simple wind vanes or complex ultrasonic anemometers without departing from the scope of the present disclosure.

In one embodiment, these wind sensors 106 may be placed along the periphery of the wind farm 100. However, in certain other embodiment, the wind sensors 106 may be dispersed at locations within the wind farm 100 or outside the wind farm 100. Further, the wind sensors 106 may be coupled to the wind turbines 102. It may be noted that the wind sensors 106 disposed along the periphery and/or outside the wind farm 100 allow the farm controller 108 to monitor wind conditions before the wind interacts with the wind turbines 102 situated on the wind farm 100. On the other hand, the wind sensors 106 coupled to the wind turbines 102 allow the farm controller 108 to monitor wind conditions experienced by wind turbines 102 due to various wind farm interactions. In some instances, the wind sensors 106 disposed along the periphery of the wind farm and the wind sensors 106 coupled to the wind turbines 102 may be employed in combination. However, in other cases, either the periphery wind sensors 106 or the wind sensor 106 coupled to the wind turbines 102 may be employed in the wind farm 100.

The farm controller 108 obtains data from the wind turbines 102, the wind sensors 106, and/or other data sources such as turbine empirical models. Employing these inputs, the farm controller 108 may perform numerical optimization and determine an optimal farm-level metric for the wind farm 100. For example, the farm controller 108 may select to optimize either the farm-level power capture or the fatigue loads experienced by the worst loaded wind turbine 102. The farm metric selected for optimization is representative of an optimization 'objective' while the other farm metric is representative of an optimization 'constraint'. In accordance with exemplary embodiments of the present disclosure, the farm controller 108 may be configured to optimize the objective, while ensuring the constraint is maintained at an acceptable level. For instance, the farm controller 108 may select to optimize the power capture of the wind farm 100, while maintaining the fatigue loads of the individual wind turbines at an acceptable level. The optimization techniques will be described in the following sections, with reference to FIGS. 2-6.

Moreover, the network 110 that couples the farm controller 108, the turbine controllers 104 and the wind sensors 106 in the wind farm 100 may include any known communication network such as a wired or wireless network including 802.11 networks, optical networks, and the like. In addition, the network 110 may be connected in any known topology, such as a ring, a bus, or hub, and may have any known contention resolution protocol without departing from the art. The network 110 provides data communication between the wind turbines 102 and the farm controller 108 in near real time.

Figure 2:
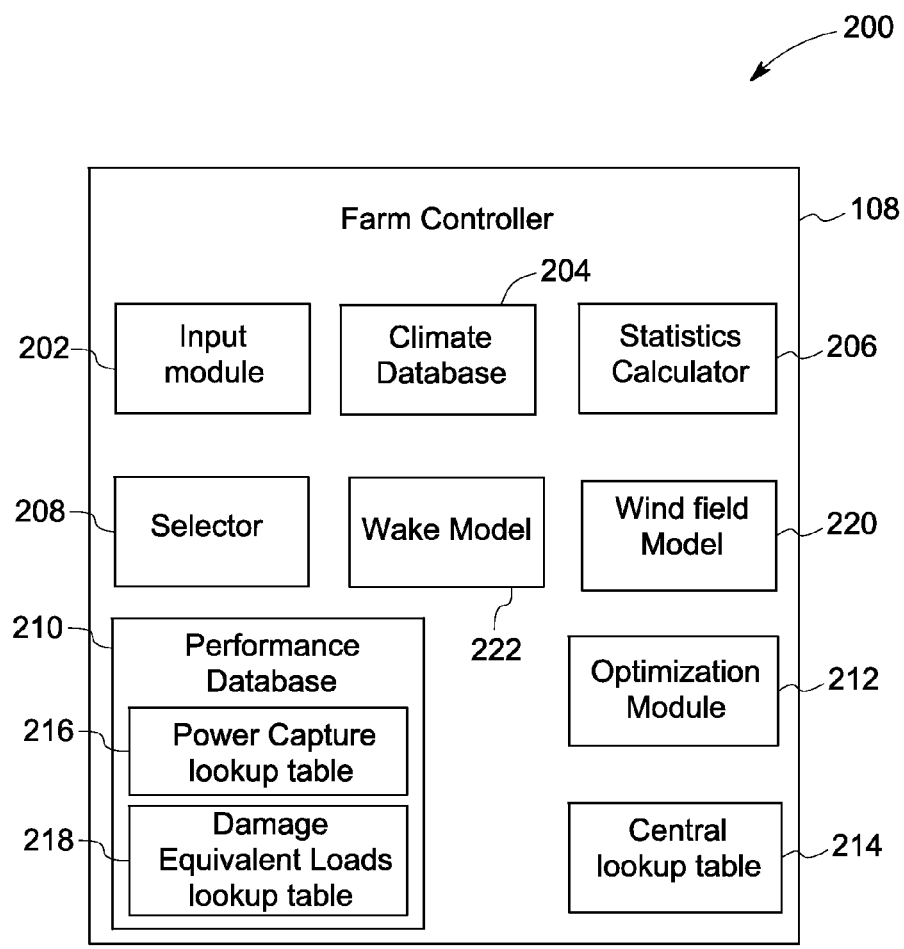
FIG. 2 is a block diagram of an exemplary farm controller, according to embodiments of the present disclosure.

Referring now to FIG. 2, a diagrammatical representation 200 of one embodiment of the exemplary farm controller 108 of FIG. 1 is depicted. In a presently contemplated configuration, the farm controller 108 includes an input module 202, a climate database 204, a statistics calculator 206, a selector 208, a farm performance database 210, and an optimization module 212. Further, the farm controller 108 may include one or more data repositories, such as a central lookup table 214, a turbine power capture lookup table 216, and a turbine damage equivalent loads lookup table 218. It may be noted that in one embodiment, the farm performance database 210 may include the power capture lookup table 216 and the DEL lookup table 218.

In addition to these modules and lookup tables, the farm controller 108 may include multiple models such as a wind field module 220 and a wake model 222. Although the farm controller 108 is shown as including the abovementioned modules, databases, and models, fewer or more modules, databases, or models may be utilized without departing from the scope of the present disclosure. For example, in some cases, some of the databases, modules, or models may be combined to form fewer modules.

The input module 202 receives wind information from one or more sources. For example, the input module 202 may receive the wind information from the wind sensors 106 installed on the wind turbines 102 and/or individual wind sensors 106 in the wind farm 100. The wind information may include wind direction, wind speed, turbulence intensity, or the like. Any other wind parameters may also be sensed and delivered to the farm controller 108. For example, other wind parameters may include ambient temperature, pressure, and turbulence intensity. It will be understood that these or any other wind parameters may be easily incorporated in the farm controller 108 for power output optimization. Further, the input module 202 may be configured to derive other wind information from the sensed prevailing conditions. For example, based on the sensed ambient temperature and pressure, the input module may calculate the air density.

Moreover, the farm controller 108 may include the climate database 204 that is configured to store climate information over time. Climate information may be calculated from average wind speeds, wind directions, turbulence intensity and so on. This information may further include wind direction-binned frequency distributions of average wind speeds determined at about 10 minute intervals. Further, the climate database may also store air density, and diurnal and seasonal air density variations. These climate properties, in some embodiments, may be determined from the ambient temperature and pressure data sensed by the wind sensors 106. Moreover, new data may override existing climate data. For example, the climate database may store climate information over a one-year period and override all previous data. In other embodiments, the climate database 204 may store previous and current values. For example, to analyze climate variations over time, the previous and current information may be stored and analyzed.

In addition, the statistics calculator 206 is configured to assimilate the damage equivalent load (DEL) values for the wind turbines 102 in the wind farm 100, over a period of time. The DEL for a wind turbine is a single value that represents the amount of fatigue experienced by the wind turbine 102 in a particular time period or number of loading cycles. Further, these values are typically reported with the corresponding reference number of loading cycles and the equivalent time period.

Over a particular time period, the fatigue damage experienced by wind turbines may fluctuate depending on real time wind conditions and turbine operation. The resulting fatigue damage (or life consumption) of a component over the time period, is substantially similar to that when subjected to the reference number of loading cycles at the DEL value over that period. Therefore, the DEL value is considered a reliable estimation of the actual fatigue damage experienced by a wind turbine over the time period. Further, the phrase 'assimilating the DEL value over a period of time' indicates accumulating the DEL values of the wind turbines 102 in real time over the particular time period. For example, over a year, the statistics calculator may update the DEL values for the wind turbines 102 to depict the total fatigue damage experienced by the wind turbines 102 in that year. Thus, the assimilated DEL value may be indicative of whether a wind turbine has experienced high fatigue loads over its operational period. In one embodiment, real time DEL values may be communicated to the statistics calculator 206 by the DEL lookup table 218. Alternatively, the DEL values can be communicated to the statistics calculator 206 by the turbine controller 204 from measurements at the wind turbines 102 using strain gauges, load cells, and the like.

The selector 208 is configured to formulate the optimization objective by analyzing various turbine level and farm level aspects. For example, the selector 208 receives the present wind conditions from the input module 202 and communicates this wind information to the climate database 204 and the statistics calculator 206. Based on the assimilated values of the DEL and the climate information received from the climate database 204 and the statistics calculator 206, the selector 208 determines whether the optimization objective is maximization of farm-level power capture or minimization of farm-level fatigue loads. For instance, the selector 208 may be configured with preset assimilated DEL threshold values. If the assimilated values of the DELs for the wind turbines exceed the DEL threshold value for that period of operation, the selector 208 may determine to optimize worst-case fatigue loads. Conversely, if the DEL values are well within the threshold value, the selector 208 may determine to optimize farm-level power capture.

Further, based on the current wind information received from the input module 202, the selector 208 may also determine the operating regime of the wind turbines 102. Generally, wind turbines operate in one of two operating modes—variable speed mode or rated power mode. Typically, at low wind speeds, the wind turbines 102 operate in the variable speed mode and at high wind speeds, the wind turbines 102 operate in the rated power mode. Accordingly, based on the wind speeds, the selector 208 determines the operating regime. In one embodiment, the turbine controller 104 may provide other turbine operational information such as rotor speeds, blade pitch angles, or the like, which may be utilized to determine the operating regime. Alternatively, this information may be retrieved from the turbine performance database 210.

Based on the selected operating regime, the selector 208 further determines the decision variables for the optimization objective and constraint. By definition, decision variables are the values or the quantities, which may be manipulated in order to arrive at the optimal optimization objective value, while satisfying the constraints. Decision variable examples include fine pitch angle, tip speed ratio, blade pitch angle, power set point, rotor speed set point, and the like. Moreover, various decision variables exist for a given optimization objective and different set of decision variables influence wind turbine 102 behavior in different operating regimes. For example, if the operating regime is variable speed mode, the selector 208 may select decision variables such as turbine fine pitch angle (defined as the pitch angle at which blades are locked during variable speed mode) and/or tip speed ratio (TSR) factor (which scales the generator torque-speed curve in variable speed mode). Similarly, if the operating regime is the rated power mode, the selector 208 may select decision variables such as turbine power set point, rotor speed set point (for pitch regulator), tip speed ratio, or blade pitch angle. It may be noted that the tip speed ratio defined as the ratio of the linear speed of the blade tip to hub-height wind speed and the blade pitch angle may be representative of operational parameters. Together these parameters uniquely determine the performance of a wind turbine such as its power capture, fatigue loads, and downstream wake effects, in prevailing wind conditions. Alternatively, at a particular wind speed, the rotor speed (or generator speed) of the wind turbine may be specified in place of the tip speed ratio. Hence, tip speed ratio and blade pitch angle may be used as optimization decision variables regardless of the operating mode. The selector 208 may be configured to formulate the optimization problem based on the decision variables, the optimization objective, and the optimization constraint.

In addition, the wind field model 220 may be an empirical model that captures the effect of the wind farm 100 and surrounding terrain on free-stream wind. Free-stream wind is the wind encountered by the wind turbines 102 based on their position in the wind farm 100 and independent of interactions with other wind turbines 102 in the wind farm 100. Data regarding terrain, land use/classification, layout of the wind farm 100, and so on, may be utilized to generate the free-stream wind data. It will be understood that these parameters are merely exemplary and any of these parameters or any other farm terrain and layout parameters may also be part of the wind field model 220. Wind field model 220 typically includes the free-stream wind data in the form of speed-up factors on wind speed and deflections in wind direction at the wind turbine locations (at hub-height) relative to wind speed and direction sensed at reference wind sensors 206. Moreover, the wind field model 220 may calculate the free-stream wind data for the various wind turbines 102 in the wind farm 100 based on the present wind conditions. In one embodiment, the wind field model 220 may model and store the free-stream wind data for each wind turbine 102 in the wind farm 100 for all wind conditions for easy retrieval later.

The wake model 222 is another empirical model that models and stores the wake-effected wind at each wind turbine 102 for various wind conditions and decision variables. Wake-effected wind is the wind encountered by the wind turbines 102 based on their position in the wind farm 100 and the interactions between various power-generating wind turbines 102 on the wind farm 100. For example, based on the number of neighbors, the distance between neighbors, the coefficient of thrust of each wind turbine 102, and the present wind conditions, wake-effected wind values may be modeled for each wind turbine 102 in the wind farm 100. In one embodiment, the wake model 222 may store the wake-effected wind information for each wind turbine 102 for all free-stream wind values. For example, the wake model 222 may store the wake-effected wind information in the form of coefficient of thrust curves for one or more decision variables. The coefficient of thrust ($C_T$) is a measure of turbine loads and wake effects downwind of a wind turbine. Moreover, this coefficient varies for different wind speeds and decision variables. Therefore, the wake model 222 may be configured to calculate and store the coefficient of thrust values as a function of wind speeds for each decision variable, such as blade pitch angle or tip speed ratio, in the form of model curves. Based on the selected decision variables, the wake model 222 may retrieve previously modeled coefficient of thrust curves and wake-effected wind speeds or model these values in real time.

Typically, a majority of the turbine layout and site information in the wind field model 220 and the wake model 222 includes static information. For example, elevation, land-use information, wind turbine layout, wind turbine hub heights, rotor diameters, and turbine control information may not change over time. Other information may be refreshed periodically. By way of an example, maintenance activity on wind turbines, age of the wind turbines 102, and other associated changes in performance, or activity status may be updated at any desired frequency. The farm controller 108 or the individual turbine controllers 104 may update the information in the wake model 222 according to the desired frequency or as and when a parameter value changes.

Moreover, the farm performance database 210 may be configured to store performance data corresponding to the wind turbines 102 in the wind farm 100. Performance data may include turbine power capture lookup table 216, and turbine damage equivalent load (DEL) lookup table 218. Further, the farm performance database 210 may also include data corresponding to the performance of the rotor and/or other physical parts of the wind turbines 102. According to one embodiment of the present disclosure, the farm performance database 210 may store performance data in the form of coefficient of power ($C_P$) curves as a function of various decision variables and wind conditions. Coefficient of power is a measure of turbine-level power capture efficiency. The $C_P$ varies as a function of various decision variables such as blade pitch angle and tip speed ratio. Therefore, the farm performance database 210 may store the coefficients of power values for various decision variables in the power capture lookup table 216. Based on the prevalent wind conditions and the selected decision variables, the power capture lookup table 216 may model power capture values based on the coefficient of power curves for the wind turbines in real time or retrieve previously calculated and stored power capture values. For example, the Cp values may be stored as a function of the turbine tip speed ratio and blade pitch angle for each wind turbine 102 in the wind farm 100.

Further, the farm performance database 210 may also store turbine DEL information for the wind turbines 102 in the wind farm 100. The DEL for a wind turbine is a single value that represents the amount of fatigue damage experienced by the wind turbine 102 in a particular time period. Similar to the other turbine characteristics, the turbine DEL also varies as a function of decision variables, average wind speed, and wind turbulence intensity. The DEL lookup table 218 may therefore be configured to store the DEL values for the wind turbines 102 as a function of one or more decision variables for various wind conditions. This information may be employed to determine the worst-case fatigue loads for the wind farm 100 based on input wind conditions. In one embodiment, the DEL lookup table 218 can be populated from a set of previously run aero-elastic wind turbine model simulations for various wind conditions and decision variable settings.

It may be noted that each wind turbine 102 may have different power capture and DEL curves based on the type and age of the wind turbine 102. Further, the power capture or DEL of a particular wind turbine may degrade, improve, or remain substantially constant over time. To account for variations in turbine performance values, the data stored in the lookup tables may be updated based on measurements at operating wind turbines 102 in the wind farm 100, and the corresponding data may be modified in the farm performance database 210, and the various associated models such as the wake model 222. It may be noted that various empirical wind turbine models, such as wind field models and wake models exist and any of these other models may be utilized in the present disclosure without departing from the scope of the present disclosure.

With continuing reference to FIG. 2, the optimization module 212 may be configured to accept static and/or dynamic data from various modules such as the input module 202, the wind field model 220, the wake model 222, and the farm performance database 210. With this data, the optimization module 212 may optimize a farm-level metric (power capture or fatigue loads) in light of a farm-level constraint (fatigue loads or power capture). Further, the optimization module 212 may be configured to determine the optimal decision variables that result in the optimum optimization objective, with the constraints satisfied. In one embodiment, the optimization module 212 may be configured to request data from these modules automatically at selected times. Alternatively, the optimization module 212 may be configured to request data continuously or at random points in time. Typically, in wind farms, the wind conditions and turbine steady-state performance vary in approximately 10-minute intervals. In these cases, the optimization module 212 may request for data every ten minutes. Based on the data received from the various modules, the optimization module 212 may be configured to perform numerous optimization functions to obtain optimum decision variables values for each active wind turbine 102 such that the selected farm metric may be maximized.

For example, the optimization module 212 may query the power capture lookup table 216 to obtain the power capture values for individual wind turbines 102 for the given wind speeds and selected decision variables. Alternatively, the optimization module 212 may query the DEL lookup table 218 for DEL values of individual wind turbines 102 for the given wind conditions and decision variables. Furthermore, the optimization module 212 may be configured to iteratively solve the optimization objective for the selected decision variables using the wake-effected wind information at each wind turbine, and the power capture and DEL information corresponding to each wind turbine 102.

Any suitable iterative numerical optimization scheme may be utilized for this optimization. For example, the optimization may be performed in a centralized or distributed fashion. Using a centralized algorithm, the complete optimization problem, with the optimization decision variables is solved iteratively at the optimization module 212. In one embodiment, the optimization problem is solved offline for possible combinations of the input wind information (average wind speed and direction). The calculated optimal decision variable values for each wind turbine 102 are stored in the central lookup table 214 with input wind information as lookup parameters. Using a distributed algorithm, the optimization problem is split into several smaller optimization problems (with fewer optimization decision variables per problem), and these smaller problems are subsequently solved iteratively at the turbine controllers 104. These turbine controllers 104 are in turn coupled to the optimization module 212. For example, in one embodiment, the optimization module 212 on the farm controller 108 may calculate the wake penalties on each downstream turbine, and communicate these to values to the turbine controllers 104. The turbine controllers optimize a composite objective iteratively based on the wake penalties and turbine-level metrics. The optimization process will be described with reference to FIGS. 4-6.

The central lookup table 214 may be configured to store the optimum decision variable values for each wind turbine 102 for various wind conditions. For example, for a range of possible wind speeds and wind directions, the optimization module 212 may be configured to calculate the optimum decision variable values and store these values in the central lookup table 214. In case of offline solution, the optimization module 212 may simply retrieve the optimum decision variable values corresponding to the monitored wind conditions from the central lookup table 214. In some instances, the optimal decision variable values may not be present for the exact wind conditions in the central lookup table 214. In these situations, the optimization module 212 may retrieve the optimal decision variable values corresponding to the closest wind condition values and interpolate between these values to arrive at the optimum decision variable values.

Figure 3:
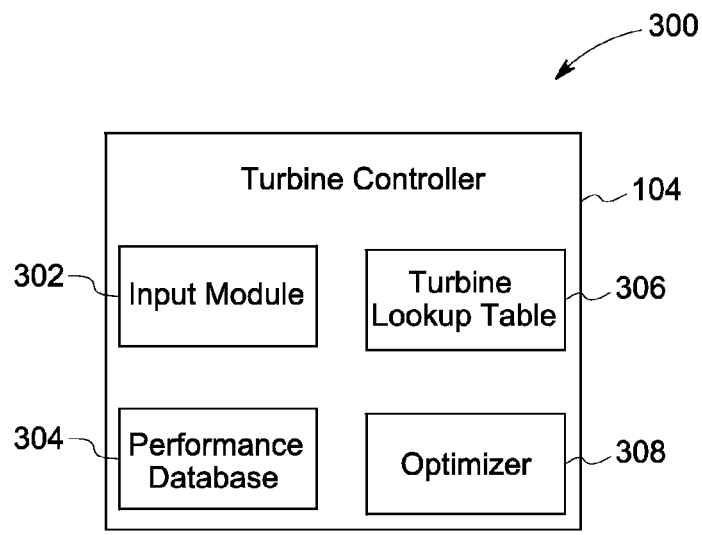
FIG. 3 is a block diagram of an exemplary turbine controller, according to embodiments of the present disclosure.

FIG. 3 is a diagrammatical representation 300 of one exemplary embodiment of the turbine controller 104 of FIG. 1. In one embodiment, the turbine controller 104 may include an input module 302, a turbine performance database 304, a turbine lookup table 306, and an optimizer 308 among other modules. It will be understood that in some embodiments the turbine controller 104 may include fewer or more modules without departing from the scope of the present disclosure.

The input module 302 may be configured to receive data from the farm controller 108 (see FIG. 1) and the wind sensors 106 installed in the wind farm 100 (see FIG. 1) or on the wind turbines 102 themselves. From the farm controller 108, the input module 302 may be configured to receive optimum decision variables values and/or wake penalties. The term wake penalty is used to refer to the impact of wake effects encountered by a wind turbine. Moreover, the input module 302 may be configured to receive wind information, periodically or continuously, from the wind sensors 106.

Additionally, the turbine performance database 304 is configured to store performance data pertinent to a corresponding wind turbine 102. Each wind turbine 102 may have its own turbine performance database 304 that stores and/or regularly updates its own performance information. For example, the turbine performance database 304 may store power capture and DEL information for its own wind turbines. In addition to this information, the database may also store coefficient of thrust values and wind turbine layout of neighboring turbines. The turbine controller 104 may utilize this information to compute downstream wake contributions from the associated wind turbine 102. In some embodiments, the turbine performance database 304 of each wind turbine 102 may be in communication with the farm performance database 210, and may, from time to time, refresh the information stored in the farm performance database 210.

Furthermore, the turbine lookup table 306 may be substantially similar to the central lookup table 214 (see FIG. 2). However, instead of storing the optimum decision variables values for various wind conditions corresponding to the wind turbines 102, the turbine lookup table 306 may be configured to store optimum decision variables values corresponding to that wind turbine.

The optimizer 308 may perform turbine level power optimization based on the received wind information, the performance information, and the wake penalties provided by the farm controller 108. The optimizer 308 may optimize a composite optimization objective and obtain the optimal decision variables values corresponding to the optimized objective. The composite objective may include two parts. The first part may be a turbine-level metric relevant to the farm-level metric being optimized. For example, if power capture is being optimized at the farm level, the turbine level metric will be turbine level power capture. The second part may represent the wake impact of that wind turbine on the turbine-level metric for its downstream wind turbines. This second part may be subtracted from the first part to derive the composite objective. The wake impact is calculated as the sum of products of wake penalties for downstream wind turbines and the wake contribution from the wind turbine under consideration. When the wake impact for a particular wind turbine is zero, that is, when the wind turbine does not have any downwind wake effects, the optimizer 308 may be configured to maximize its own power capture, or minimize its own fatigue loads (DELs). However, if all the wind turbines 102 in the wind farm 100 act to optimize their own turbine-level metrics, high wake effects can be expected and the wind farm behavior may not be optimal. Therefore, in accordance with embodiments of the present disclosure, the turbine controller 104 optimizes the composite objective, which includes the wake impact of the turbine operation.

Often, the wind turbine controller 104 may not be able to process certain decision variables, such as operational parameters including tip speed ratio and blade pitch angle. In these embodiments, the optimizer 308 may be configured to calculate physical parameter values corresponding to the operational parameter values obtained from the farm controller 108 and apply these physical parameters to the wind turbines 102 for optimizing a given farm metric. In other embodiments, the optimizer 308 may receive monitored wind conditions from the input module 302 and compare these conditions with stored wind conditions in the turbine lookup table 306. For the supplied decision variables, physical parameters associated with the matching wind conditions may be extracted from the turbine lookup table 306 and applied to the wind turbine 102.

Figure 4:
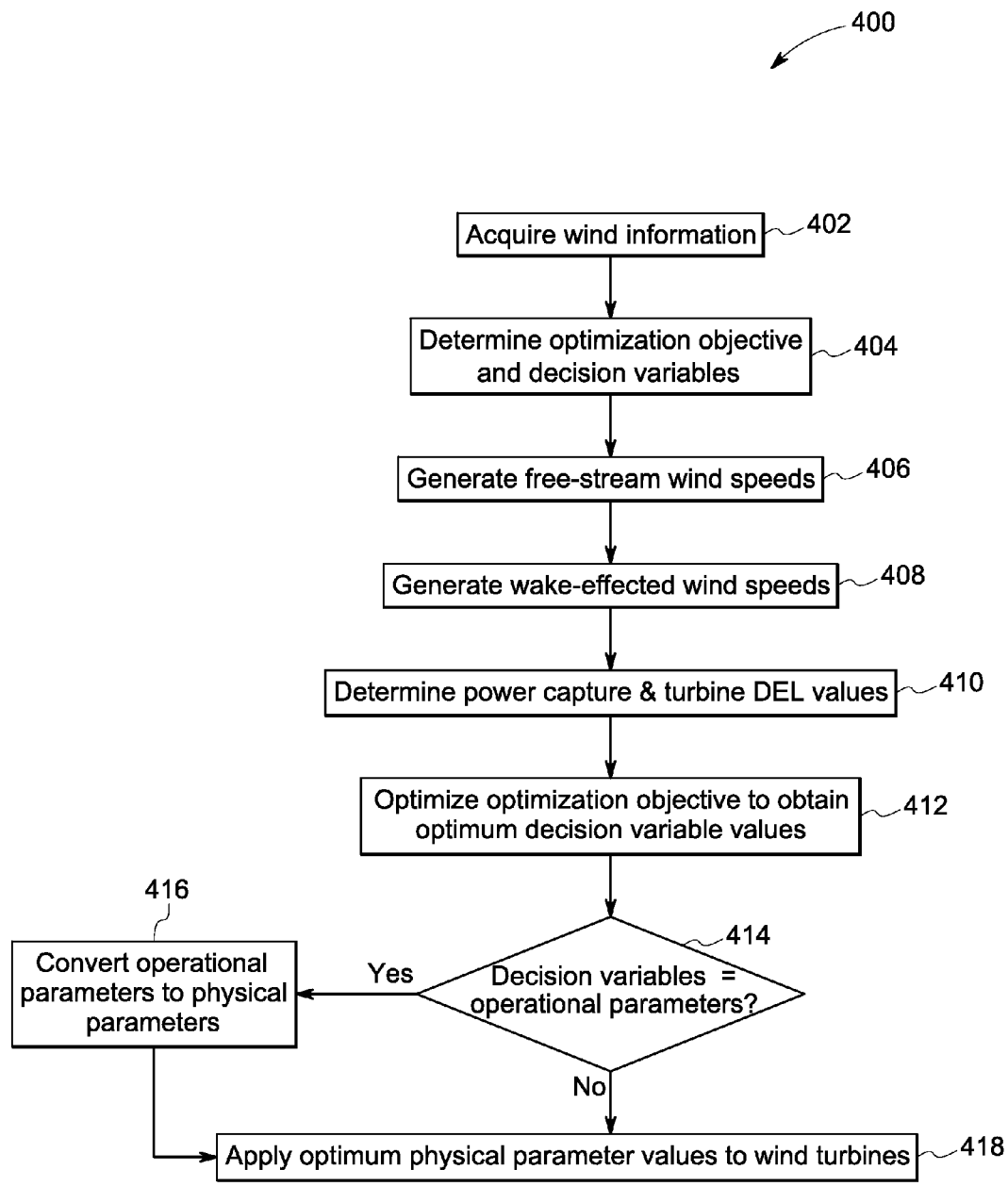
FIG. 4 is a flow chart depicting an exemplary method for optimizing farm-level metrics of the wind farm of FIG. 1, according to embodiments of the present disclosure.

FIG. 4 is a flowchart 400 illustrating an exemplary method for optimizing one or more farm-level metrics. The method of FIG. 4 is described with reference to FIGS. 1-3. Further, the method 400 may be described in a general context of computer executable instructions. Generally, computer executable instructions may include routines, programs, objects, components, data structures, procedures, modules, functions, and the like that perform particular functions or implement particular abstract data types. In certain embodiments, the computer executable instructions may be located in computer storage media, such as a memory and in operative association with a processing subsystem. In certain other embodiments, the computer executable instructions may be located in computer storage media, such as memory storage devices, that are removed from the farm controller 108 or the turbine controller 104. Moreover, the method for optimizing a wind farm metric includes a sequence of operations that may be implemented in hardware, software, or combinations thereof.

The method starts at step 402, where the input module 202 receives prevailing wind information monitored by the wind sensors 106 and provides this information to the farm controller 108. The wind sensors 106 may continuously monitor the wind or be programmed to provide inputs at determined times, such as ten minutes intervals, half an hour intervals, and the like. Measured wind properties may include wind speed and direction. Based on the measured information, the input module 202 or the wind sensors 106 may further calculate other wind information, such as air density.

Subsequently, at step 404, the selector 208 in the farm controller 108 formulates the optimization function by determining the optimization metric and the decision variables to be optimized. To this end, the selector 208 selects the optimization objective (fatigue loads or power capture). This decision is based on the assimilated DELs for the wind turbines 102 in the wind farm 100 and the long-term wind climate obtained from the statistic calculator 206 and the climate database 204 respectively. If the value of DELs is greater than a threshold value, the selector 208 is configured to determine that the worst-case fatigue loads in the wind farm 100 should be optimized. Alternatively, if the DELs are below the threshold, the selector 208 may be configured to determine that the power capture should be optimized. The optimization objective selection criteria may vary from application to application and the selector 208 may be configured to apply any rules to determine the optimization objective without departing from the scope of the present disclosure.

Further, the selector 208 may determine the operating regime for the wind turbines 102 based on the present wind conditions and/or other information received from the wind turbines 102, such as rotor speeds, blade pitch angles, and so on. Based on the operating regime, the selector 208 further determines the decision variables. These outputs (optimization objective and decision variables) are communicated to the optimization module 212.

At step 406, the wind information obtained in step 402 is communicated to the wind field model 220. Based on the prevailing wind conditions, the wind field model 220 generates the free-stream wind speeds and directions at the hub-heights of the wind turbines 102.

Next (at step 408), the free-stream wind information is provided to the wake model 222 along with the decision variables determined by the selector 208. With these inputs, the wake model 222 generates the wake-effected wind speeds for each wind turbine 102 in the wind farm 100.

Subsequently, the wake-effected wind speed information is provided to the turbine DEL lookup table 218 or the power capture lookup table 216 in the farm performance database 210. Further, the decision variables selected by the selector 208 are also provided as inputs to the power capture lookup table 216 and the DEL lookup table 218. For example, if the selector 208 includes the optimization of the farm-level power capture using tip speed ratio (TSR) and blade pitch angle (BPA), the wake-effected wind speeds and TSR and BPA operational parameters are provided as inputs to the power capture lookup table 216 and the DEL lookup table 218. Based on the decision variables, the power capture lookup table 216 determines and retrieves the power capture values corresponding to individual wind turbines 102 for the given wind speeds at step 410. Similarly, the DEL lookup table 218 determines and retrieves the DELs for individual wind turbines for the given wind speeds at this step.

Subsequently, at step 412, the optimization module 212 optimizes the farm-level metric to obtain optimum decision variables values for each wind turbine. To this end, the optimization module 212 is configured to utilize the retrieved power capture values as inputs to the optimization objective, and use the DEL values as inputs to the optimization constraints or vice-versa (depending on the farm-level metric selected). It is desirable to maximize the objective while keeping the constraints within acceptable limits. Accordingly, the optimization module 212 iteratively calculates the objective value based on the wake-effected wind data from the wake model 222, and the power capture values and the DEL values from the farm performance database 210 until the optimum objective value is obtained. The decision variables that generate the optimum objective are representative of the optimum values.

In accordance with aspects of the present disclosure, optimized mechanical power for a particular turbine i may be calculated using the mathematical equation:

$$\text{Mech. power}_i = \frac{1}{2}\rho A C_p(\text{set point}) V_{wake,i}^3 \qquad (1)$$

where, $\rho$ is air density, A is rotor swept area, and $V_{wake}$ is the equivalent wake affected wind velocity at the hub-height for wind turbine i.

Wake velocity may be determined as a function of the coefficient of thrust using:

$$V_{wake} = f(C_t(\text{Decision variable}_{1-N})) \qquad (2)$$

where, $V_{wake}$ is the vector of equivalent wake-effected wind speeds at hub-heights of the wind turbines 1-N.

In addition, electrical power for the wind turbines may be obtained by subtracting mechanical loses from the mechanical power obtained in equation 1.

$$\text{Elect. power}_i = \text{Mech. power}_i - \text{Losses}(\text{Mech. power}_i) \qquad (3)$$

where, losses refer to the power loss because of mechanical friction in the moving components of the wind turbine, electrical conversion losses at the generator and the converter, and other such power reducing factors.

The decision variable values may include any values that optimize the optimization objective (power capture or fatigue loads) of the wind farm 100. These values, however, may not exceed values that cause the respective turbine rotors to stall or cause the wind turbines 102 to exceed the rotational speed, torque, or design power limitations.

As noted previously, wind turbines 102 may not be able to process all decision variables. Generally, the wind turbine controllers 104 may not have the necessary components to process operational parameters such as tip speed ratio or blade pitch angle. In such cases, if the selected decision variables are operational parameters the farm controller 108 may convert the operational parameters into physical parameters that the wind turbines 102 can process. For instance, the operational parameters may be converted into physical parameters, such as fine-pitch angle, rotor speed set point, torque/power set point, tip speed ratio factor set point, and the like. Accordingly, at step 414, the method 400 determines whether the decision variables are operational parameters. If the decision variables are operational, the method proceeds to step 416 where the operational parameters are converted into physical parameters. Standard functions may be utilized to convert the operational parameters into the physical parameters without departing from the scope of the present disclosure.

However, at step 414, if it is determined that the decision variables are representative of physical parameters, the method proceeds to step 418 where the turbine controller 104 processes the physical parameters to alter the operation of the wind turbines 102, thereby optimizing the farm-level metric/objective.

As previously noted, the optimization module 212 may calculate the optimum decision variables in ten minutes intervals, for example. However, because the optimization problem involves several decision variables and several constraints, solving the optimization problem might become computationally intensive. In addition, it may not be feasible to implement a real time solution on the farm controller 108 using the currently available bandwidth and processor speeds. In accordance with aspects of the present disclosure, methods for optimizing the farm-level metrics that overcome the computational difficulties are presented. In particular, an offline computation method and a distributed real time method for optimizing the farm-level metrics are presented.

In the offline computation method, the optimization module 212 may calculate and store the optimum decision variables values for all possible wind conditions (speed and direction) and decision variables. As the terrain information and the performance data for the wind turbines 102 do not change substantially in a given period, the variables that affect optimization only include wind speed and direction. The optimum values for each wind turbine 102 corresponding to various wind speeds and directions may be stored in the central lookup table 214, for example. Whenever, the optimum values are required, the optimization module 212 requests wind information from the input module 202. Subsequently, based on the selected decision variables, the optimization module 212 may search the central lookup table 214 for matching or substantially similar wind conditions and may retrieve the corresponding optimum decision variables values corresponding to the wind turbines 102. These values may then be communicated to the turbine controllers 104 for application. In case the sensed wind conditions do not have an exact match in the central lookup table 214, values may be interpolated using two or more wind conditions in the neighborhood to obtain the optimum values.

In another embodiment, instead of using the central lookup table 214, turbine lookup tables 306 (see FIG. 3) may be used to retrieve optimum decision variable values for corresponding wind turbines. The farm controller 108 may communicate the selected decision variables and the optimization objective to the turbine controller 104. The wind turbine 102 may subsequently determine the incoming wind speed and direction, extract the corresponding optimum decision variable values, and apply these set points to alter wind turbine operation. In this case, turbine controllers 104 may control the optimum decision variables values to obtain farm-level metric optimization, without intervention from the optimization module 212.

Figure 5:
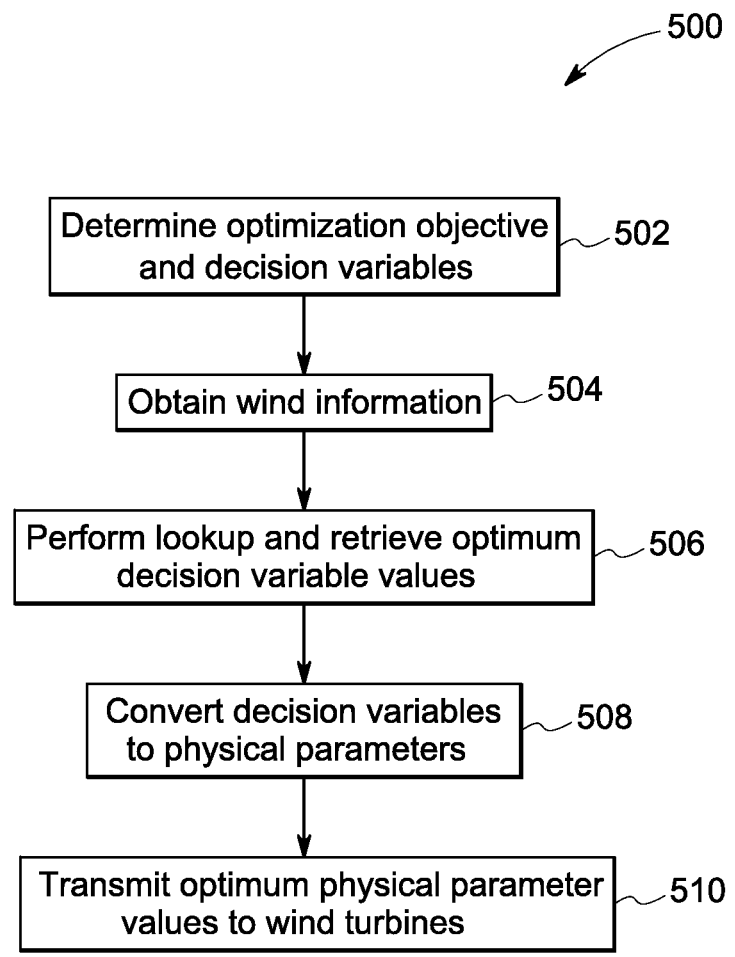
FIG. 5 is a flow chart depicting an exemplary method for offline optimization of decision variable values, according to embodiments of the present disclosure.

FIG. 5 is a flowchart illustrating an exemplary method 500 for optimizing a farm-level metric using the offline solution according to aspects of the present disclosure. The method starts at step 502 where the selector 208 determines the optimization objective and the decision variables for optimization. Next, at step 504, the wind sensors 106 monitor the wind conditions and provide this information to the optimization module 212 or the optimizer 308. At step 506, the optimizer 308 or the optimization module 212 performs a lookup in the turbine lookup table 306 or the central lookup table 214, respectively, and retrieves the optimum decision variable values corresponding to the monitored wind conditions. Subsequently, the retrieved values may be converted into physical parameter values as indicated by step 508. Also, these physical parameter values are transmitted to the turbine controller 104 for further action, as depicted by step 510.

The offline solution has a low implementation risk, as the solution does not rely on real time calculations. Moreover, this solution utilizes minimum feedback information from the wind farm (wind information). This solution, however, is completely model-based. Often, over time, some of the turbine properties may vary. For example, turbine availability, or power capture characteristics may vary as the wind turbine ages. The offline method may be utilized when optimum values are required at short turnaround times and computations in real time are not desired.

In case the wind farm 100 has the operational capability to perform real time complex computations, another solution is also contemplated that addresses the optimization problem in a distributed fashion. This approach may also be referred to as an online or real time solution. In the distributed real time solution, with certain assumptions, the original large optimization problem can be re-formulated as multiple small optimization problems. These smaller optimization problems may be coupled together with some wake penalty terms and solved iteratively to farm-level convergence. This solution may be implemented on a multi-core computing machine, or a distributed computing network, in one embodiment. An example of a distributed computing network is the wind farm 100, with multiple wind turbine controllers 104 and a 'master' wind farm controller 108 communicating over the farm network 110. This approach allows multiple small optimization problems to use multiple 'reference parameter' sets, in effect incorporating more real time feedback in the optimization. For example, average wind speeds, wind directions, and turbulence intensity values at all the wind turbines 102 can be used, thereby allowing lower dependency on the models and some compensation for deviation of model prediction from actual wind farm response. Turbine availability information can also be considered in the online solution.

Additionally, in one embodiment, the optimization module 212 receives the input information and the terrain and wake information to derive wake penalties for each wind turbine 102. The wake penalties are a function of prevailing wind conditions and decision variable values. In another embodiment, the optimization module 212 may directly receive measured real time power capture values from the individual wind turbines 102 to determine the wake penalties. Wake penalties may vary based on the number of neighbors, the relative locations of neighboring wind turbines, and the wind velocity and direction. These calculated wake penalties are transmitted to the respective wind turbines 102, which in turn computes a wake impact value based on the wake penalties and the wake effects of the wind turbine on neighboring wind turbines. The turbine controller 104 subtracts this calculated wake impact from a turbine-level metric to obtain a composite objective value. The composite objective is optimized at the turbine controller 104, and optimal decision variable values for the turbine are determined. These optimal decision variable values are provided back to the farm controller 104 for determination of farm-level optimality. If optimality has not been reached, the operation is repeated until the maximum farm-level objective is achieved.

Figure 6:
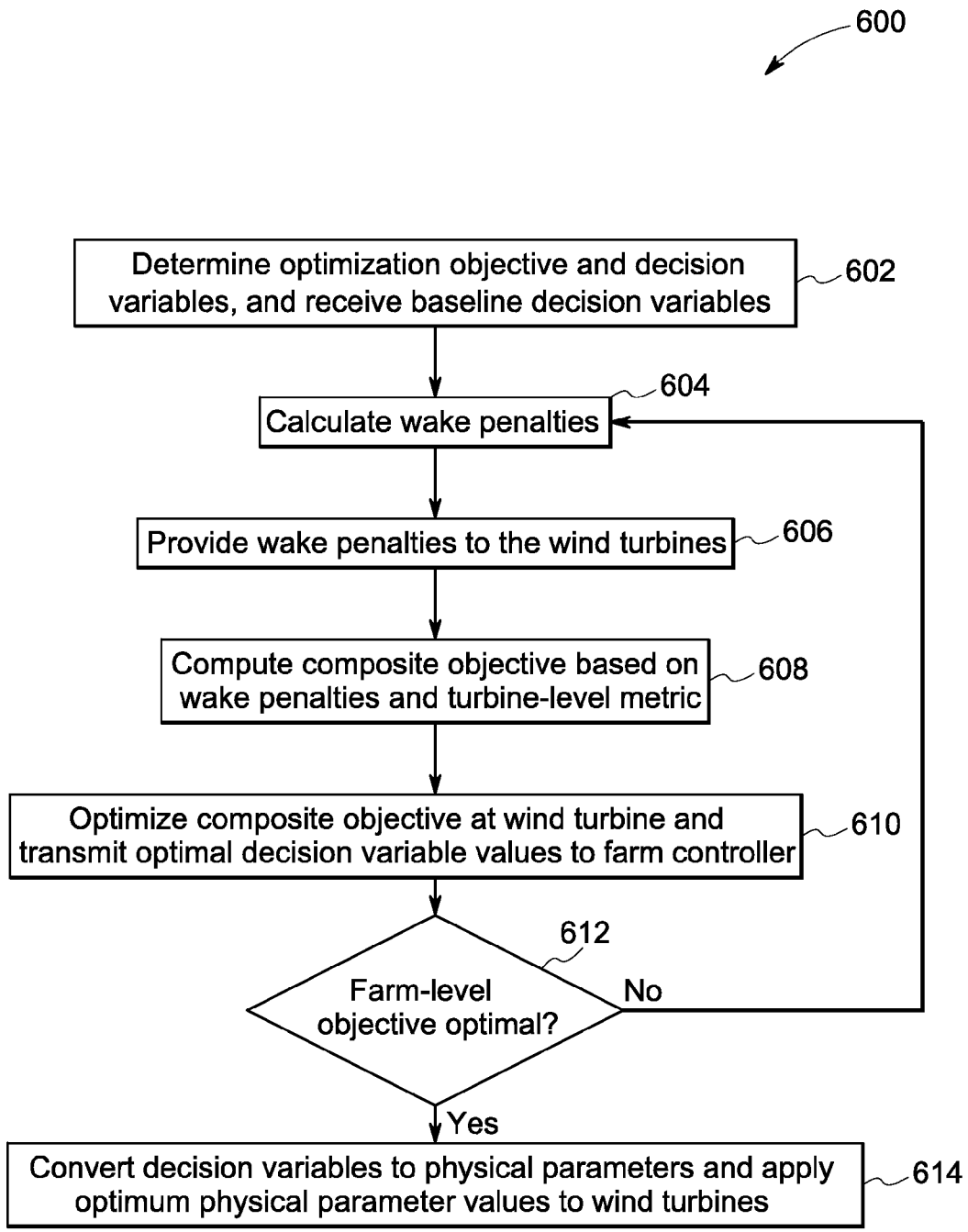
FIG. 6 is a flow chart depicting an exemplary method for optimizing decision variable values in real time, according to aspects of the present disclosure.

Referring now to FIG. 6, a flow chart 600 illustrating an exemplary distributed online optimization method is presented. The method 600 begins at step 602, where the farm controller 108 determines the optimization objective and the decision variables for the optimization function. Further, the farm controller 108 receives baseline decision variable values corresponding to each active wind turbine 102 in the wind farm 100. The baseline decision variables may be representative of the values corresponding to the maximum power outputs for each wind turbine 102 individually. These values may be derived from the farm performance database 210 and the prevalent wind conditions. At this step, monitored wind conditions may also be provided to the farm controller 108. Further, wake-effected wind information may also be provided to the farm controller 108.

Subsequently, at step 604, the farm controller 108 determines the wake penalties for each downwind wind turbine 102 in the wind farm 100. Wind turbines that do not have any upwind neighbors may not have any associated wake penalty, while those wind turbines with more neighbors clustered at short upstream distances may have a higher wake penalty. In one embodiment, the wake penalty may be determined as a function of the coefficient of thrust of each wind turbine 102 and the wind conditions experienced at each wind turbine 102.

At step 606, the farm controller 108 transmits the wake penalties to the wind turbines 102. The turbine controller 104, subsequently, calculates a wake impact of the wind turbine on its downstream neighbors. The wake impact may be calculated as the sum of products of wake penalties for downstream wind turbines and the wake contribution from the wind turbine under consideration. Further, the turbine controller determines the turbine level metric such as power capture or fatigue loads as a function of the selected decision variables and attempts to maximize a composite objective function F that deducts the wake impact of the wind turbine on its downstream neighbors from its own turbine-level metric, as depicted in step 608. For example, the function F for turbine i may be represented as:

$$F_i = \text{Turbine level metric}(\text{decision variable}_i) - \Sigma_{j=1}^{M}\{\text{Wake penalty}_j \times \text{Wake Contribution}_{i \to j}(\text{decision variable}_i)\} \quad (4)$$

where Wake Contribution$_{i \to j}$ is the effect of operation of turbine i on the turbine-level metric at turbine j, and M is the number of downstream wind turbines affected by turbine i.

When wake penalties for all wind turbines downstream of the wind turbine under consideration are zero, the composite objective merely maximizes the turbine-level metric. In case of power optimization, this optimization is substantially similar to the baseline turbine controller operation where power capture is maximized in given wind conditions. However, when the wind turbines 102 in the wind farm 100 act to maximize individual coefficients of power, high wake losses can be expected and farm behavior is non-optimal. In one embodiment, this behavior may be penalized by an increment in the wake penalties for each downstream wind turbine 102. The output of step 608 is an optimum composite objective value in light of the wake penalties calculated by the farm controller 108.

Moreover, at step 610, the calculated composite objective values are optimized for the selected wind turbine decision variables. Optimal decision variable values are transmitted back to the farm controller 108, where the values are aggregated to determine the total farm objective value. The farm controller 108 then determines whether the total farm objective value satisfies the optimization criteria. Accordingly, a check is carried out at step 612 to determine whether the total farm objective value is optimal. If it is determined that the total farm objective value is not optimal within specified tolerances, control may be returned to step 604 and the wake penalties may be recalculated. On the other hand, if the objective is determined to be optimal, the method proceeds to step 614. At step 614, the optimum decision variable values are converted to optimum physical parameters values if the decision variables are operational parameters and if the wind turbines 104 cannot process operational parameters.

Increased wake penalties place an emphasis on reducing the coefficient of thrust (CT) of wind turbines that produce wake effects during the next iteration of turbine-level optimization solutions, in addition to maximizing power capture. This iterative step advantageously results in smaller wake losses at the wind farm-level, and a subsequent smaller increment or decrement in wake penalties for the wind turbines that cause wake effects. In this manner, wake penalty updates and turbine-level optimization solutions take place in an iterative manner until a converged solution of turbine decision variables is reached.

Furthermore, the foregoing examples, demonstrations, and process steps such as those that may be performed by the system may be implemented by suitable code on a processor-based system, such as a general-purpose or special-purpose computer. It should also be noted that different implementations of the present disclosure may perform some or all of the steps described herein in different orders or substantially concurrently, that is, in parallel. Furthermore, the functions may be implemented in a variety of programming languages, including but not limited to C++ or Java. Such code may be stored or adapted for storage on one or more tangible, machine-readable media, such as on data repository chips, local or remote hard disks, optical disks (that is, CDs or DVDs), memory, or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a data repository or memory.

Moreover, the various lookup tables, such as the central lookup table, the turbine lookup table, the power capture lookup table, and the DEL lookup table may be incorporated in any data repository system. For example, these lookup tables may be implemented in a read only memory, random access memory, flash memory, relational databases, or any other form of memory without departing from the scope of the present disclosure. Further, these lookup tables may be stored in a single data repository or in individual data repositories.

The various embodiments of the systems and the methods for the optimization of farm-level metrics in a wind farm described hereinabove dramatically enhance the operation of a wind farm. For example, using the methods described herein, the overall power capture from the wind farm can be increased, thereby improving the efficiency of the farm. Further, the fatigue loads experienced by the wind turbines in the wind farm may also be reduced such that fatigue loads are within desired working limits. Embodiments of the present disclosure automatically select either power capture optimization or fatigue load optimization based on various turbine characteristics (such as damage equivalent loads and age of the wind turbine), and wind conditions (present and past wind speeds and directions). Moreover, depending on the wind turbine operating regime, the systems of the present disclosure may select one or more suitable decision variables for the optimization function.

While only certain features of the invention have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A method comprising:
   acquiring prevailing wind information for a wind farm from wind sensors;
   modeling wake-affected wind conditions based at least in part on the acquired prevailing wind information;
   calculating power capture values and damage equivalent load values for at least some of a plurality of wind turbines on the wind farm;

using the power capture values and the damage equivalent load values for determining an optimization objective of the wind farm and one or more decision variables for optimization, wherein the optimization objective comprises either maximizing farm-level power capture or minimizing farm-level fatigue loads, and wherein the one or more decision variables correspond to the determined optimization objective;

optimizing the optimization objective based on the wake-affected wind conditions, the power capture values, and the damage equivalent load values to calculate optimum decision variable values of the wind farm;

transmitting the optimum decision variable values to the respective wind turbines; and using the optimum decision variable values at the respective wind turbines to achieve the optimization objective.

2. The method of claim 1, further comprising:
calculating free-stream wind speeds based on the acquired prevailing wind information; and
modeling the wake-affected wind conditions based on the free-stream wind speeds.

3. The method of claim 1, further comprising:
determining whether the one or more decision variables are representative of operational parameters; and
converting the operational parameters to physical parameters.

4. The method of claim 1, wherein determining the optimization objective comprises:
assimilating the damage equivalent load values for the one or more wind turbines in the wind farm over a period of operation;
comparing the assimilated damage equivalent load values with one or more threshold values over the period of operation; and
if the assimilated damage equivalent load values exceed the one or more threshold values over the period of operation, determining that the optimization objective of the wind farm is minimizing farm-level fatigue loads.

5. The method of claim 1, wherein determining the one or more decision variables further comprises determining an operating regime of the one or more wind turbines in the wind farm.

6. The method of claim 1, wherein calculating the optimum decision variable values comprises:
comparing the acquired prevailing wind information with stored wind information present in a data repository, wherein the data repository comprising optimum decision variable values corresponding to the stored wind information; and
retrieving the optimum decision variable values from the data repository corresponding to the acquired prevailing wind information.

7. The method of claim 1, wherein calculating the optimum decision variable values further comprises calculating wake penalties corresponding to each wind turbine.

8. The method of claim 7, further comprising calculating the wake penalties and optimizing composite objective values iteratively until the optimum decision variable values result in an optimum farm-level metric.

9. The method of claim 8, wherein determining the optimum decision variable values is performed in real time.

10. The method of claim 1, wherein calculating the damage equivalent load values for at least some of a plurality of wind turbines on the wind farm is based at least in part on use of a climate database configured to store acquired wind information corresponding to a determined period of time and a statistics calculator configured to assimilate damage equivalent load values for the one or more wind turbines.

11. The method of claim 1, further comprising:
calculating wake penalties for the wind turbines; and
transmitting the wake penalties to the corresponding turbine controllers.

12. The method of claim 11, further comprising calculating, by a respective turbine controller, a composite objective function based on a respective wake penalty of the respective wind turbine.

13. The method of claim 12, wherein optimizing the optimization objective to calculate optimum decision variable values further comprises using the composite objective value.

14. The method of claim 1, wherein using the optimum decision variable values at the respective wind turbines to achieve the optimization objective comprises calculating a respective wind turbine level composite objective function at a wind turbine based on a respective wake penalty of the respective wind turbine, using the respective wind turbine level composite objective function for determining respective wind turbine level optimal decision variable values, and transmitting the respective wind turbine level optimal decision variable values to a wind farm level controller for use in calculating the optimum decision variable values of the wind farm.

15. A computer-readable non-transitory media storing computer executable code to perform the method of:
acquiring prevailing wind information at a wind farm from one or more wind sensors;
calculating free-stream wind speeds based on the acquired prevailing wind information;
modeling wake-affected wind conditions based on the free-stream wind speeds;
calculating power capture values and damage equivalent load values for one or more wind turbines on the wind farm based on the wake-effected wind conditions;
using the power capture values and the damage equivalent load values for determining an optimization objective of the wind farm and one or more decision variables for optimization, wherein the optimization objective comprises either maximizing farm-level power capture or minimizing farm-level fatigue loads, and wherein the one or more decision variables correspond to the determined optimization objective;
optimizing the optimization objective based on the wake-affected wind conditions, the power capture values, and the damage equivalent load values to calculate optimum decision variable values;
transmitting the optimum decision variable values to the respective wind turbines; and
using the optimum decision variable values to at the respective wind turbines to achieve the optimization objective.

* * * * *